(12) United States Patent
Harmann et al.

(10) Patent No.: US 8,581,483 B2
(45) Date of Patent: Nov. 12, 2013

(54) DEVICE FOR CONDUCTING AWAY LOST HEAT, AS WELL AS ION ACCELERATOR ARRANGEMENT HAVING SUCH A DEVICE

(75) Inventors: Hans-Peter Harmann, Lindau (DE); Norbert Koch, Ulm (DE); Mathias Clages, Nersingen (DE)

(73) Assignee: Thales Electronic Systems GmbH, Ulm (DE)

( * ) Notice: Subject to any disclaimer, the term of this patent is extended or adjusted under 35 U.S.C. 154(b) by 653 days.

(21) Appl. No.: 12/733,627

(22) PCT Filed: Sep. 12, 2008

(86) PCT No.: PCT/EP2008/062173
§ 371 (c)(1),
(2), (4) Date: Nov. 29, 2010

(87) PCT Pub. No.: WO2009/037203
PCT Pub. Date: Mar. 26, 2009

(65) Prior Publication Data
US 2011/0089808 A1    Apr. 21, 2011

(30) Foreign Application Priority Data

Sep. 14, 2007  (DE) .......................... 10 2007 043 954
Dec. 21, 2007  (DE) .......................... 10 2007 062 150

(51) Int. Cl.
*F03H 1/00*      (2006.01)

(52) U.S. Cl.
USPC .......................................... 313/359.1; 313/11

(58) Field of Classification Search
USPC ............... 313/591.1, 11, 59.1, 113, 588, 567, 313/359.1, 62, 230; 165/185; 315/111.81; 250/251; 327/510; 376/106
See application file for complete search history.

(56) References Cited

U.S. PATENT DOCUMENTS

| | | | |
|---|---|---|---|
| 3,465,522 A | | 9/1969 | Anderson et al. |
| 5,260,623 A | * | 11/1993 | Bradatsch ........................ 313/40 |
| 5,945,781 A | | 8/1999 | Valentian |
| 5,990,600 A | * | 11/1999 | Konishi et al. .................. 313/45 |
| 6,378,290 B1 | | 4/2002 | Killinger et al. |
| 6,382,502 B1 | * | 5/2002 | Fukui et al. .................... 228/222 |
| 7,084,572 B2 | | 8/2006 | Kornfeld et al. |
| 7,583,506 B1 | * | 9/2009 | Huang et al. ................... 361/719 |
| 2003/0183368 A1 | * | 10/2003 | Paradis et al. ................. 165/80.3 |

(Continued)

FOREIGN PATENT DOCUMENTS

| | | |
|---|---|---|
| DE | 1 244 680 | 7/1967 |
| DE | 199 48 229 | 5/2001 |

(Continued)

OTHER PUBLICATIONS

International Search Report, 2009.

(Continued)

*Primary Examiner* — Mariceli Santiago
*Assistant Examiner* — Glenn Zimmerman
(74) *Attorney, Agent, or Firm* — Collard & Roe, P.C.

(57) ABSTRACT

The invention relates to an ion accelerator arrangement comprising an ionization chamber which is surrounded by a chamber wall and a magnetic arrangement that is disposed outside the chamber wall. Steps are taken to dissipate lost heat occurring on the chamber wall, and advantageous solutions are provided to protect permanent-magnet elements of the magnetic arrangement.

14 Claims, 1 Drawing Sheet

(56) References Cited

U.S. PATENT DOCUMENTS

Figure 1:
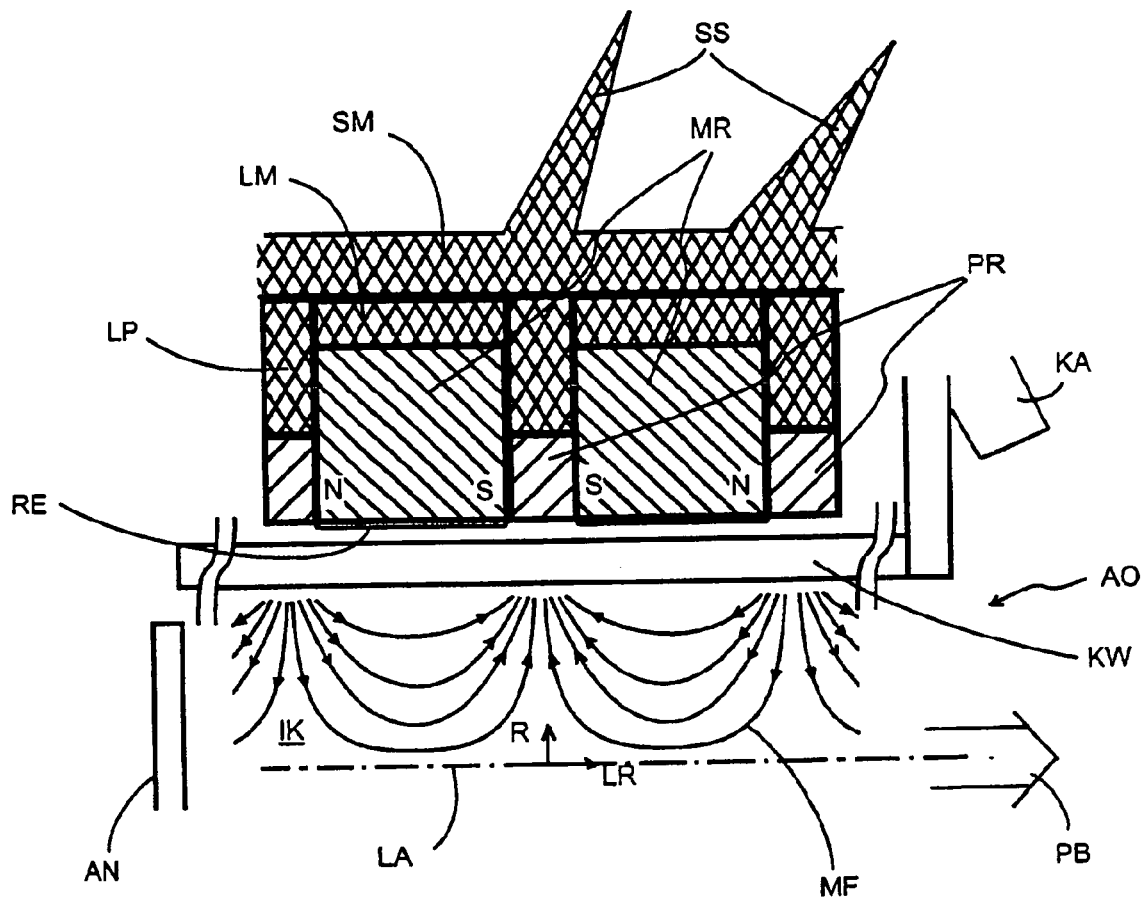

2003/0198019 A1* 10/2003 Kinoshita et al. .............. 361/704
2005/0169328 A1* 8/2005 Freeman et al. ................. 372/36
2006/0042825 A1* 3/2006 Lu et al. ......................... 174/252
2007/0266714 A1* 11/2007 Fiedler ............................... 62/6

FOREIGN PATENT DOCUMENTS

| DE | 696 21 411 | 1/2003 |
| EP | 1 180 783 | 2/2002 |
| WO | WO 03/000550 | 1/2003 |

OTHER PUBLICATIONS

David M. Jacobson et al: "A Novel Lightweight Microwave Packaging Technology," IEEE Transactions on Components, Packaging and Manufacturing Technology: Part A, IEEE Service Center, Piscataway, NJ, US, vol. 21, No. 3, Sep. 1, 1998, XP011011112, ISSN: 1070-9886. (ISR).

"MSFC-398 Material Properties Data Sheet" NASA MSFC, [Online] Apr. 2001, XP-007908872, Retrieved from the Internet on Jun. 15, 2009: URL: http://techtran.msfc.nasa.gov/tech_ops/nasa398alloy.pdf (ISR).

* cited by examiner

DEVICE FOR CONDUCTING AWAY LOST HEAT, AS WELL AS ION ACCELERATOR ARRANGEMENT HAVING SUCH A DEVICE

CROSS REFERENCE TO RELATED APPLICATIONS

This application is the National Stage of PCT/EP2008/062173 filed on Sep. 12, 2008, which claims priority under 35 U.S.C. §119 of German Application No. 10 2007 043 954.9 filed on Sep. 14, 2007 and German Application No. 10 2007 062 150.9 filed on Dec. 21, 2007. The international application under PCT article 21(2) was not published in English.

The invention relates to a device for dissipating the lost heat, as well as to an ion accelerator arrangement having such a device.

Ion accelerator arrangements are known as electric drives for satellites or other spacecraft. An advantageous ion accelerator drive of this type is described in WO 2003/000550 A1, for example. The known ion accelerator contains a multi-stage magnet arrangement having permanent magnet rings and pole shoe rings, which surround a chamber wall of an ionization chamber.

In the operation of such ion accelerator arrangements, lost heat occurs at the chamber wall that laterally delimits the ionization chamber, which heat must be dissipated to the outside. Because of volume and weight restrictions when used in spacecraft, and due to the use of high voltages in such ion accelerator arrangements, there are special requirements for devices to conduct away lost heat, which can be given off, particularly in the case of use in spacecraft, only by means of radiation into free space as a heat sink, and is at least partly carried away from the chamber wall by way of the magnet arrangement, for this purpose. In this connection, the ability of the magnet arrangement to withstand temperature stress is limited, particularly when using permanent magnets.

In traveling wave tubes, lost heat primarily occurs due to the impact of electrodes of a bundled electron beam onto the anode as a collector. The anode consists of copper, for example. Conducting the waste heat away typically takes place by way of a radiator arrangement that is heat-conductively coupled with the anode, directly or by way of an intermediate structure.

In a device for conducting away lost heat, particularly in such electrical devices such as ion accelerator arrangements or traveling wave tube arrangements, a heat dissipation arrangement that faces away from the lost heat source is supposed to be connected with a carrier structure, such as, for example, with a magnet arrangement of the ion accelerator arrangement or the collector of the traveling wave tube arrangement, respectively, in mechanically firm manner, for one thing, and with good heat conductivity, for another, whereby material, geometry, and structure of the magnet arrangement or the collector, respectively, are generally pre-determined, to a great extent, by the function of the electrical device, in each instance.

It is known to provide bodies made of copper in the heat dissipation arrangement, which bodies conduct heat toward the outside, to a radiator arrangement that radiates heat off by way of surfaces that face the outside, and which bodies are coupled to the carrier structure with special transition structures, to balance out mechanical stresses that occur with temperature variations, or are soldered onto metallic surfaces of the carrier structure.

The present invention is based on the task of indicating an improved device for dissipating lost heat, as well as an ion accelerator arrangement having such a device.

Solutions according to the invention are described in the independent claims. The dependent claims contain advantageous embodiments and further developments of the invention.

In the case of a device for conducting away lost heat from a lost heat source, particularly in one of the aforementioned electrical devices, by way of a heat conduction arrangement that is heat-conductively connected with a carrier structure that faces the lost heat source, to a heat sink, the use of an aluminum-silicon alloy in the heat conduction arrangement proves to be surprisingly particularly advantageous. The heat conduction arrangement advantageously consists predominantly, preferably completely of the Al—Si alloy.

In particular, the use of an Al—Si alloy having a hypereutectic proportion of Si is particularly advantageous. The heat expansion coefficient of the Al—Si alloy advantageously differs from the heat expansion coefficient of the carrier structure by less than 30%, particularly less than 20%, preferably by less than 10%. In this connection, use is advantageously made of the recognition that the heat expansion coefficient of a hypereutectic Al—Si alloy is adjustable over a wide range when varying the proportions of Al and Si in the alloy, and therefore can be well adapted to a heat expansion coefficient predetermined by the material of the carrier structure.

The heat conductor arrangement is advantageously structured in a form that surrounds the carrier structure. The carrier arrangement advantageously surrounds a space that contains the lost heat source, laterally, circumferentially with reference to a longitudinal axis. The heat conduction arrangement advantageously lies against the carrier structure under elastic bracing, thereby resulting in a permanent and large-area heat transfer at the boundary surface between the carrier structure and the heat conduction arrangement. The situation that the heat conduction arrangement lies against the carrier structure under elastic bracing can particularly be produced by means of heat-shrinking the heat conductor arrangement onto the carrier structure. The heat conductor arrangement can particularly also advantageously form a mechanical connection of multiple parts of the carrier structure.

It is also advantageous for good heat transfer between the carrier structure and the heat conduction to provide at a boundary surface between the carrier structure a thinner layer of typically less than 1 mm, particularly less than 0.1 mm, which consists of a material having a higher ductility than the materials of the carrier structure and the heat conduction arrangement. The use of gold for such an intermediate layer is particularly advantageous. The carrier structure and the heat conduction arrangement can also be soldered to one another.

The carrier arrangement advantageously contains a magnet arrangement, particularly a magnet arrangement having permanent magnet bodies. The material of such a permanent magnet arrangement is preferably a rare earth alloy, particularly samarium-cobalt SmCo. The permanent magnet arrangement advantageously contains at least one, preferably multiple ring magnet bodies having magnetization directed axially with reference to the ring axis.

In another advantageous embodiment, the heat conduction arrangement can also consist, in place of an AlSi alloy, at least predominantly of beryllium, which also possesses an advantageous heat expansion coefficient and a low specific weight, but is expensive and difficult to handle.

The production of a permanent magnet arrangement having multiple ring magnet bodies that follow one another axially, by means of thermally shrinking on the heat conduction arrangement, is particularly advantageous even independent of the material of the heat conduction arrangement, since in this way, cohesion of the multiple ring magnet bodies is achieved in simple and advantageous manner and/or magnet bodies, which are at particular risk of fracture, such as those made of SmCo, for example, are stabilized and protected by means of the pressure stress that is uniform all around. If no lost heat has to be dissipated, the heat conductivity of the heat conduction arrangement, which is then primarily a mechanical sheath, is secondary.

Such a device for conducting away lost heat is particularly advantageous in the case of electrical devices that produce lost heat in spacecraft, where a permanent, good heat transfer is particularly important due to the absence of repair possibilities, and material connections are under particular stress due to the great temperature differences between rest state and operation of the electrical devices. In the case of the particularly advantageous use of a heat conduction arrangement made of an Al—Si alloy in a spacecraft, the heat conduction arrangement advantageously passes the heat absorbed by way of the carrier structure on to a radiator arrangement, which gives off the heat, as heat radiation, to the surrounding space as a heat sink.

In the case of an ion accelerator arrangement having a magnet arrangement, it was surprisingly shown that an alloy of aluminum and silicon, having a hypereutectic proportion of silicon, as the material for at least the predominant part of the heat conduction arrangement, can be particularly coordinated with the typical magnetizable materials of the magnet arrangement, which are predetermined by the function of the ion accelerator arrangement. The proportion of silicon in the hypereutectic Al—Si alloy preferably amounts to less than 40%. Advantageously, the proportion of Si in the alloy amounts to maximally 60%. In the case of a eutectic Al—Si alloy, the Si proportion lies at approximately 12%.

The hypereutectic Al—Si alloy advantageously possesses a higher heat conductivity as compared with the materials of the magnet arrangement, and a lower specific weight, and can be coupled with surfaces of typical materials of the magnet arrangement of the ion accelerator arrangement with particularly advantageous heat transfer, because of its material properties. In particular, the hypereutectic Al—Si alloy possesses a heat expansion coefficient that comes very close to the one of magnetizable materials that are preferably used in the typical magnet arrangements, particularly iron as a soft-magnetic material or rare earth materials, preferably SmCo, as permanent magnetic materials. A slight difference in the heat expansion coefficients is of significant advantage, since high temperature variations can occur in an ion accelerator arrangement of the type stated.

Magnetizable materials of typical carrier structures, particularly Fe and SmCo, possess heat expansion coefficients, in an advantageous embodiment, between $8 \times 10^{-5}$/K and $16 \times 10^{-5}$/K, particularly between $11 \times 10^{-5}$/K and $13 \times 10^{-5}$/K. The heat expansion coefficient of the hypereutectic Al—Si alloy provided in the heat conduction arrangement according to the invention can advantageously be further varied by means of the percentage ratio of Al and Si, and be adapted to the materials of the magnet arrangement. The heat expansion coefficient of the hypereutectic Al—Si alloy advantageously differs from the expansion coefficients of the materials of the magnet arrangement, in each instance, by less than 30%, particularly less than 20%, advantageously less than 10%.

The heat conduction arrangement, in an advantageous embodiment, surrounds the magnet arrangement radially with reference to a center axis of the ion accelerator arrangement, and is preferably shrunk onto the magnet arrangement or parts of the same, under elastic bracing of the materials, so that the heat conduction arrangement and the magnet arrangement lie against one another with good surface contact, under elastic bracing. At the boundary surfaces, in an advantageous embodiment, intermediate layers of a material that conducts heat well and is softer as compared with the materials of magnet arrangement and heat conduction arrangement, for example gold, can be provided, thereby resulting in particularly good heat transfer by means of a contact surface that is particularly large, due to deformation of the intermediate layer.

The heat conduction arrangement advantageously gives off heat by way of surface regions facing away from the magnet arrangement, of a radiator arrangement coupled with the heat conduction arrangement, as heat radiation into the surroundings, in the case of preferred use of the ion accelerator arrangement in a spacecraft, particularly into the surrounding empty space. The surfaces that radiate the heat radiation to the surroundings can consist of a material different from the hypereutectic Al—Si alloy, and can particularly be provided by coatings.

The heat conduction arrangement advantageously consists at least predominantly (>50%), preferably essentially, for example with the exception of a surface coating, completely of the hypereutectic Al—Si alloy. Preferably, the radiator arrangement also consists predominantly or essentially completely of the hypereutectic AlSi alloy.

The ion accelerator arrangement contains an ionization chamber, whereby a lost heat source is disposed on or at a chamber wall that delimits the chamber and is typically dielectric, for example ceramic. A working gas is ionized in the ionization chamber and ions are accelerated, preferably electrostatically, in a longitudinal direction of the ionization chamber, and ejected through an opening on one side of the chamber.

The magnet arrangement contains multiple permanent magnet rings that surround the ionization chamber of the ion accelerator arrangement, which rings are spaced apart from one another in a longitudinal direction of the chamber. In a preferred embodiment, permanent magnet rings that are adjacent to one another in the longitudinal direction have opposite pole orientations in the longitudinal direction, so that in the longitudinal direction, poles that have the same direction, of adjacent magnet rings, face one another. In this way, a cusp structure of the magnetic field occurs in the chamber, in the longitudinal direction, between adjacent magnet rings, as it is described, for example, in an ion accelerator from the document WO 2003/000550 A1 that was already mentioned initially. A multi-stage magnet arrangement having at least two such cusp structures of the magnetic field, spaced apart in the longitudinal direction, in the ionization chamber of an electrostatic ion accelerator, is particularly advantageous. The material of the permanent magnet rings is preferably a rare earth alloy, particularly having the main components samarium and cobalt. Samarium-cobalt permanent magnets are known and usual, and are characterized by a higher Curie temperature as compared with neodymium magnets.

Advantageously, pole shoe rings made of soft-magnetic material, particularly iron, are disposed between permanent magnet rings that are spaced apart in the longitudinal direction.

The lost heat that occurs is problematical, particularly for permanent magnet materials, for which no high temperatures are permissible, and which, on the other hand, generally possess a low heat conductivity and therefore themselves can contribute only a small contribution to conducting away lost heat to the heat conduction arrangement.

The permanent magnet bodies of the magnet arrangement typically lie not directly on the outer surface of the chamber wall that delimits the chamber laterally, but rather are spaced apart from it by a narrow gap, so that a transfer of the lost heat from the chamber wall to the permanent magnet bodies takes place by way of heat radiation. By means of a heat radiation reflector device between chamber wall and permanent magnet bodies, such a heat transfer is reduced, and overheating of the permanent magnet materials is prevented. Such a heat radiation reflector device can contain mirror bodies disposed radially between the outer chamber wall and the permanent magnet bodies. Preferably, the heat radiation reflector device is formed by a reflective coating of the surfaces of the permanent magnets bodies that face the chamber wall, whereby advantageously, gold can be used as a coating material. Advantageously, no heat radiation reflector device is present radially between the outer chamber wall and the surfaces of soft-magnetic pole shoes that face it, so that lost heat is conducted away to the outside, to the heat conduction arrangement, by way of the pole shoes, which preferably consist of iron and are not temperature-sensitive, but at the same conduct heat well. The reduction in heat absorption by the permanent magnet bodies by means of the heat radiation reflector device is advantageous for overheating protection of the permanent magnet bodies and for distribution of the lost heat that occurs, even independent of the material of the heat conduction arrangement.

In the case of a traveling wave tube arrangement, the use of an Al—Si alloy, particularly having a hypereutectic Si proportion, also proves to be particularly advantageous. Here, a heat conduction arrangement is advantageously connected, indirectly or preferably directly, with the anode body (collector) as a carrier structure, which typically consists of copper, particularly shrunk on for permanent surface contact that provides good heat conduction, whereby the Si proportion of the Al—Si alloy, in such a case, can typically be selected to be lower than in the preceding example of the ion accelerator, since the heat expansion coefficient of the anode body is generally higher than that of the magnet arrangement of the ion accelerator arrangement. The heat conduction arrangement can be soldered to the anode body.

Figure 2:
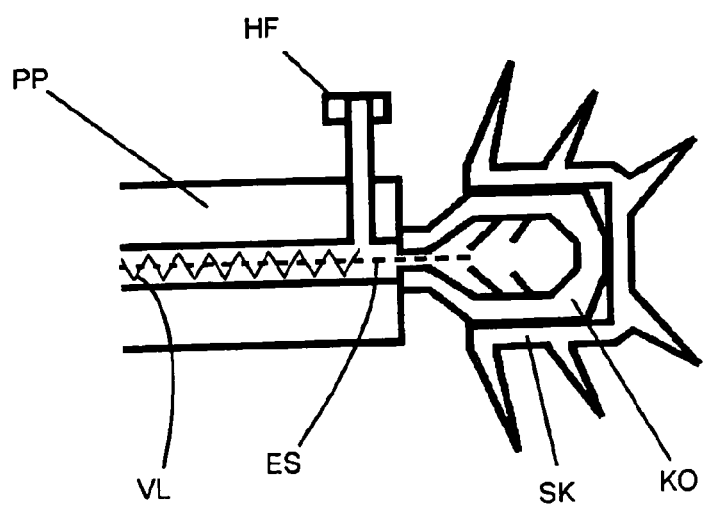

The invention will be illustrated in greater detail in the following, using preferred exemplary embodiments and making reference to the figures. These show:

FIG. 1 a schematic structure of an ion accelerator,

FIG. 2 a detail of a traveling wave tube arrangement.

FIG. 1 shows, schematically and in details, a section through an ion accelerator arrangement, which shall be assumed, without any restriction in generality, to lie about a longitudinal axis LA, with rotation symmetry. Because of the symmetry, only half of the sectional image, above the longitudinal axis LA, is shown. The longitudinal axis LA runs parallel to a longitudinal direction LR, which is shown in the figure along with the radius coordinate R. An ionization chamber IK is delimited, in the radial direction, by a chamber wall KW made of dielectric, particularly ceramic material. The chamber cross-section shall be assumed to be constant in the longitudinal direction LR. The ionization chamber is open toward one side in the longitudinal direction, on the right in the drawing, and there allows an accelerated plasma beam PB to exit, which yields the drive thrust in an ion accelerator arrangement used as a spacecraft drive device. An anode arrangement AN is disposed at the foot of the ionization chamber IK, opposite the beam exit opening AO in the longitudinal direction. In the region of the beam exit opening AO, preferably offset laterally from it, a cathode arrangement KA is disposed. During operation of the arrangement, a high voltage lies between the cathode arrangement KA and the anode arrangement AN, which voltage generates an electrical field in the ionization chamber, which field points in the longitudinal direction LR and attempts to accelerate electrons in the direction toward the anode arrangement, and accelerates positive ions that were formed by means of ionization of the working gas in the direction of the beam exit opening AO.

Outside the plasma chamber and surrounding it, there is a magnet arrangement that contains permanent magnet bodies MR, particularly made of SmCo, and pole shoe bodies PR next to and between them, in the longitudinal direction. The permanent magnet bodies MR and the pole shoe bodies PR are preferably structured to be ring-shaped, in each instance, with reference to the longitudinal axis LA. However, multiple individual bodies can also be grouped around the axis. The poles of the magnet bodies are oriented in the longitudinal direction, and magnet bodies adjacent to one another in the longitudinal direction possess a poling that is opposite from one another, so that the same poles, such as two south poles S in FIG. 1, stand opposite one another. This type of arrangement of permanent magnet bodies brings about a magnetic field MF in the ionization chamber IK that forms so-called cusp structures in the region of the poles of the magnet bodies, in other words regions in which the field lines make a transition, from the longitudinal axis LA toward the chamber wall KW, in a curve, into an approximately radial magnetic field line progression. By means of the pole shoe bodies PR, the progression of this field can advantageously be brought into a form that is further improved for the function of the ion accelerator arrangement.

The structure and function of such ion accelerator arrangements are known, for example from the state of the art mentioned initially. While it is true that in the case of such ion accelerator arrangements, the heat stress on the chamber wall is already reduced, as compared with the known Hall ion accelerators, a lost heat effect on the surface of the chamber wall that faces the ionization chamber, by means of electrons and ions that impact it, and by means of radiation from the plasma that forms in the ionization chamber still remains, whereby the heat effect on the chamber wall is slightly elevated in the longitudinal region of the pole shoe bodies PR, as compared with the longitudinal regions that contain the magnet bodies PR. By means of heating of the chamber wall, heat is also radiated off in the direction of the magnet arrangement from the side of the chamber wall that faces radially outward. And it is transported radially outward by way of the magnet arrangement, and radiated off into the surrounding space, for which purpose a radiator arrangement advantageously possesses large-area radiator structures SS.

A heat dissipation device, in the advantageous example shown, contains a radiator arrangement that lies radially on the outside, having a mantle SM and the radiator structures SS that have already been mentioned, on the one hand, and a heat conduction arrangement that lies between the radiator arrangement and the magnet arrangement, on the other hand. At least the heat conduction arrangement consists at least predominantly of the hypereutectic AlSi alloy. The heat conduction arrangement contains multiple ring bodies LM, LP as heat conduction bodies, whereby the ring bodies LP are disposed in the longitudinal region of the pole shoe bodies PR and the heat conduction bodies LM are disposed in the region of the permanent magnet bodies MR and connected, mechanically and heat-conductively, with the pole shoe bodies PR and the permanent magnet bodies MR, respectively, in each instance. These heat conduction bodies and/or the radiator arrangement SM, SS advantageously consist at least predominantly of a hypereutectic Al—Si alloy having a proportion of silicon of advantageously at least 40%. The proportion of silicon in the hypereutectic Al—Si alloy advantageously amounts to at most 60%. Other admixtures in low proportions are fundamentally possible.

With the hypereutectic Al—Si alloy for the heat conduction bodies, a heat expansion coefficient can be achieved for these that lies very close to that of iron or of SmCo. The heat conduction bodies LP and LM are preferably structured as closed ring bodies. The heat conduction bodies lie against the outward-facing surfaces of the pole shoe bodies PR and permanent magnet bodies MR, respectively, preferably with radial bracing, in order to achieve a permanently mechanically stable surface contact and to guarantee good heat transfer in the radial direction. Intermediate layers of a material having good heat conductivity, which is softer than the materials of the heat conduction bodies and the pole shoe bodies and permanent magnet bodies, respectively, can advantageously be inserted at the boundary surfaces of the heat conduction bodies LP to the pole shoe bodies PR or the heat conduction bodies LM to the permanent magnet bodies MR, respectively. Such an intermediate layer results in further improved heat transfer radially to the outside, because of a larger contact surface. The use of gold for such intermediate layers is particularly advantageous. Such an intermediate layer can also be provided between the radiator arrangement having the radiator mantle SM and the heat conduction arrangement having the heat conduction bodies LP, LM. Advantageously, the structure of the magnet arrangement with the heat dissipation device takes place in such a manner that the pole shoe bodies PR are connected with the heat conduction bodies LP, and the permanent magnet bodies MR are connected with the heat conduction bodies LM, and afterwards, the ring-shaped arrangements connected in this manner are set together in the axial direction and rigidly connected with one another. Afterwards, the outside of the heat conduction arrangement formed by the heat conduction bodies LP, LM is advantageously smoothed, and brought to a defined outside dimension. Afterwards, the radiator arrangement is advantageously brought to a temperature that is elevated with regard to the heat conduction arrangement, whereby it widens, and is pushed over the heat conduction arrangement in the longitudinal direction. During cooling of the radiator arrangement and the related shrinkage, the radiator arrangement lays itself against the outside of the heat conductor arrangement, with radial bracing, thereby resulting in good heat conduction contact again.

The surfaces of the permanent magnet bodies MR that radially face the chamber wall KW are provided with a coating RE as a reflector device, which reduces the absorption capacity for heat radiation and thus the heat transfer from the chamber wall to the permanent magnet bodies. The coating advantageously consists of gold. The coating does not extend to the surfaces of the pole shoe bodies that face the chamber wall, in other words it is interrupted, in the longitudinal direction, at the pole shoe bodies.

During operation of the ion accelerator arrangement, the chamber wall is heated up and radiates off heat, radially to the outside, in the direction of the magnet arrangement. The heat absorbed by the magnet arrangement is transported, in accordance with a radial temperature gradient, by way of the permanent magnet bodies MR, the pole shoe bodies PR, and the heat conduction arrangement having heat conduction bodies LP, LM, to the mantle SM of the radiator arrangement, and there it is given off into space, as heat radiation, particularly by way of the radiator structures SS.

Because of the relatively low heat conductivity of the permanent magnet bodies MR, made of SmCo, for example, the radial heat transport takes place primarily by way of the pole shoe bodies PR, which particularly consist of iron, despite their lesser expanse in the longitudinal direction. In this connection, the distribution of the proportions of the radial heat conduction within the magnet arrangement advantageously corresponds to the higher wall temperature in the longitudinal regions of the pole shoe bodies, due to higher heat introduction at these longitudinal positions. The heat radiation reflector device is advantageously interrupted in the longitudinal regions of the pole shoe bodies, in the longitudinal direction, and is present only in the longitudinal regions of the permanent magnet bodies. A good heat transfer from the chamber wall to the pole shoe bodies, which preferably consist of iron, is advantageous for conducting the heat away radially.

By means of the reflector device on the surfaces of the permanent magnet bodies that face the chamber wall, the temperature at the chamber wall can lie higher in the longitudinal regions of the permanent magnet bodies than in the longitudinal regions of the pole shoe bodies. To a limited extent, heat equalization can take place in the longitudinal direction, by means of heat conduction within the material of the chamber wall. In particular, however, the higher chamber wall temperature also leads to an increased heat radiation into the ionization chamber, thereby partly compensating the reduced radiation radially to the outside once again.

The reflector device on the surfaces of the magnet arrangement that face the lost heat source can advantageously be provided even in the case of a magnet arrangement of a traveling wave tube arrangement.

FIG. 2 shows, in details and schematically, the structure of a traveling wave tube arrangement having a device for conducting away lost heat power, according to the present invention. The traveling wave tube arrangement contains, in usual manner, a delay line VL, for example in the form of a helical line or comb line, in a vacuum chamber. The vacuum chamber with the delay line VL is surrounded by a magnet arrangement PP, which generates a magnetic field in the vacuum chamber, in which an electron beam ES is guided on the center longitudinal axis of the vacuum chamber or the delay line VL, respectively. The electron beam ES is fed in from an electron beam source, not shown in FIG. 2, from the left, and after passing through the delay line VL, it is guided to a collector KO. The electron beam ES, during its forward movement through the vacuum chamber, enters into interaction with a high-frequency signal that is fed into the delay line VL, which is uncoupled in amplified form via an output HF. The electron beam moves opposite a delaying electrostatic field and gives off power to the delay line in its interaction with it. In the collector KO, the electrons are collected and their residual energy is converted to heat in the collector KO. The collector can consist of copper, for example, and can also be structured as a multi-stage collector, in known manner.

A radiation body SK is set onto the outer surface of the collector KO, and is connected with the collector KO so as to conduct heat well. The radiation body SK consists of the AlSi alloy, the percentage alloy proportions of which are advantageously set in such a manner that the heat expansion coefficient of the AlSi alloy differs by leas than 300, particularly less than 20%, preferably by less than 10% from the heat expansion coefficient of the material of the collector KO. The radiation body SK can advantageously lie against the outer surface of the collector under elastic bias and, in an advantageous embodiment, can be pushed over the collector at elevated temperature and shrunk onto the outer surface of the collector as it cools. The radiation body SK can also be soldered to the outer surface of the collector.

The radiation body SK shown in one piece in FIG. 2 can also be structured radially in two parts, analogous to the arrangement according to FIG. 1, with reference to the longitudinal axis of the arrangement, in that a base body of AlSi is attached to the collector KO, and an outer body that has the radiator structures is attached to this base body.

The lost heat power that occurs in the collector during operation of the traveling wave tube arrangement is passed on to the radiator structures by way of the collector, which consists of material having good heat conductivity, and the good heat conduction connection between the collector and the radiator body SK, which consists of an AlSi alloy material having good heat conductivity, and there given off to the surroundings, as radiation power, particularly into space, in the case of space applications of such a traveling wave tube arrangement.

The characteristics indicated above and in the claims, as well as those that can be derived from the figures, can advantageously be implemented both individually and in various combinations. The invention is not restricted to the exemplary embodiments described, but rather can be modified in many different ways, within the scope of the actions of a person skilled in the art. In particular, in the case of the ion accelerator arrangement, the reflector device can advantageously be implemented also independent of the Al—Si material selection.

The invention claimed is:

1. Ion accelerator arrangement having a device for conducting away lost heat, having an ionization chamber, and a magnet arrangement that surrounds the ionization chamber, as well as having a heat conduction body for dissipating lost heat that occurs at the chamber wall, whereby the heat conduction body is heat-conductively and mechanically firmly connected with the magnet arrangement, and possesses at least one of a greater heat conductivity and a lower specific weight in comparison with the magnet arrangement, wherein the heat conduction body comprises at least predominantly an aluminum-silicon alloy having a hypereutectic proportion of silicon, or wherein a heat radiation reflector device is disposed at least between a part of the surfaces of the magnet arrangement that face the chamber wall and are spaced apart from the chamber wall.

2. Arrangement according to claim 1, wherein the proportion of silicon amounts to at least 30%.

3. Arrangement according to claim 1, wherein the proportion of silicon amounts to at most 60%.

4. Arrangement according to claim 1, wherein the heat conduction body surrounds the magnet arrangement and is radially braced relative to the magnet arrangement.

5. Arrangement according to claim 4, wherein the heat conduction body is shrunk onto the magnet arrangement.

6. Arrangement according to claim 1, wherein the material of the magnet arrangement possesses a heat expansion coefficient between $8 \times 10^{-5}$/K and $16 \times 10^{-5}$/K.

7. Arrangement according to claim 1, wherein the magnet arrangement contains multiple permanent magnet rings that surround the ionization chamber, which are spaced apart from one another in a longitudinal direction of the ionization chamber.

8. Arrangement according to claim 7, wherein permanent magnet rings that are adjacent in the longitudinal direction of the ionization chamber have polings oriented in opposite directions.

9. Arrangement according to claim 7, wherein pole shoe rings made of soft-magnetic material are inserted between permanent magnet rings that are adjacent in the longitudinal direction.

10. Arrangement according to claim 1, wherein the heat conduction body is coupled with a radiator arrangement that gives off heat to the surroundings, by means of radiation.

11. Arrangement according to claim 1, wherein the heat radiation reflector device is present on surfaces of permanent magnet materials.

12. Arrangement according to claim 1, wherein the heat radiation reflector device is interrupted at pole shoes, in longitudinal sections.

13. Arrangement according to claim 1, wherein the heat radiation device is formed by a reflective coating on the magnet arrangement.

14. Arrangement according to claim 1, wherein the arrangement is placed in a spacecraft.

* * * * *

UNITED STATES PATENT AND TRADEMARK OFFICE
CERTIFICATE OF CORRECTION

PATENT NO. : 8,581,483 B2  Page 1 of 1
APPLICATION NO. : 12/733627
DATED : November 12, 2013
INVENTOR(S) : Harmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 913 days.

Signed and Sealed this
Twenty-second Day of September, 2015

Michelle K. Lee
*Director of the United States Patent and Trademark Office*